US007878086B2

(12) United States Patent
Min

(10) Patent No.: US 7,878,086 B2
(45) Date of Patent: Feb. 1, 2011

(54) DRIVE MECHANISM FOR A LOCK

(76) Inventor: Yu Min, Unit 06-07A, 20th Floor, Future Place, 111-113 New Ming Street, Kwun Tong, Kowloon, Hong Kong (CN)

(*) Notice: Subject to any disclaimer, the term of this patent is extended or adjusted under 35 U.S.C. 154(b) by 780 days.

(21) Appl. No.: 11/878,051

(22) Filed: Jul. 20, 2007

(65) Prior Publication Data

US 2008/0016926 A1 Jan. 24, 2008

(30) Foreign Application Priority Data

Jul. 21, 2006 (CN) ........................ 2006 2 0062146

(51) Int. Cl.
*F16H 25/20* (2006.01)

(52) U.S. Cl. ...................................... 74/424.77; 74/425

(58) Field of Classification Search .............. 74/424.77, 74/425, 458; 411/392

See application file for complete search history.

(56) References Cited

U.S. PATENT DOCUMENTS 1,261,933 A * 4/1918 Hipwell ...................... 222/390
2,637,550 A * 5/1953 Ritter ......................... 160/188
2,682,176 A * 6/1954 Fagley et al. .................. 74/458

* cited by examiner

*Primary Examiner*—William C Joyce
(74) *Attorney, Agent, or Firm*—Jacobson Holman PLLC

(57) ABSTRACT

A drive mechanism for a lock comprises a linear-moving sleeve (1), a conversion spring (2) and a rotating transmission component (3). The rotating component (3) is inserted into the linear-moving sleeve (1) that moves along the rotating component (3) in an axial direction. The conversion spring (2) is fitted onto the rotating component (3). The linear-moving sleeve (1) has symmetric protrusions (11). The rotating component (3) comprises an end (4) and a rotating bolt (5). The rotating bolt (5) is plugged into the clipping end (4). The conversion spring (2) has two curved ends (21) which are inserted into the groove (51) of the rotating bolt (5). The conversion spring (2) rotates in conjunction with the rotating of the rotating bolt (5) and the rotation movement is converted to linear movement along the rotating bolt (5).

5 Claims, 1 Drawing Sheet

DRIVE MECHANISM FOR A LOCK

FIELD OF THE INVENTION

The present invention relates to a lock component and, in particular, a drive mechanism for a lock.

SUMMARY OF INVENTION

An object of the present invention is to provide a new type of drive mechanism for a lock which converts a rotational movement of a spring to an axial and linear movement to drive the lock. The mechanism has a simple and reasonable structure and is easy to operate and cheap to produce.

To achieve the above object, the present invention provides a type of drive mechanism for a lock comprising a linear-moving sleeve (1), a conversion spring (2) and a rotating component (3). The rotating component (3) is inserted in the linear-moving sleeve (1) that moves along the rotating component (3) in an axial motion. The conversion spring (2) is fitted onto the rotating component (3). The linear-moving sleeve (1) has symmetric protrusions (11).

The rotating component (3) can be of an integrated or a split structure. An embodiment of the present invention adopts the split structure for the rotating component (3) that comprises a clipping end (4) and a rotating bolt (5) with the rotating bolt (5) partially plugged into the clipping end (4).

Curved ends (21) of the conversion spring (2) are inserted into a groove (51) of the rotating bolt (5).

The adoption of the above structure enables the conversion spring (2) to rotate in conjunction with the rotation of the rotating bolt (5), and the rotating movement is then converted to linear movement along the rotating bolt (5). Thus, the sleeve (1) is made to move linearly in an axial motion to achieve the drive function.

DETAILED DESCRIPTION OF THE INVENTION

Figure 1:
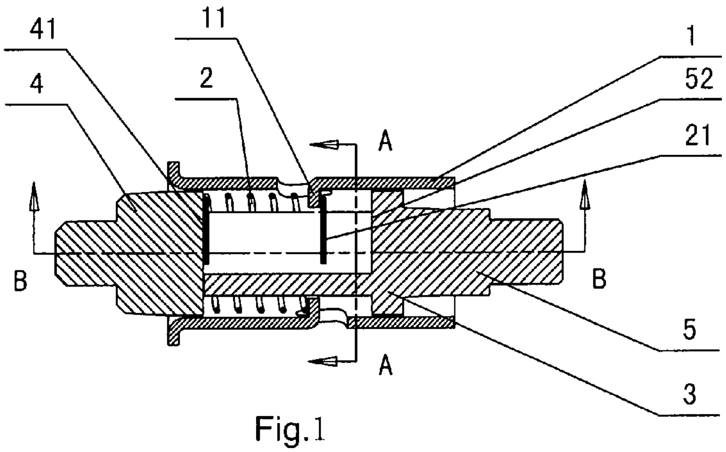
FIG. 1 is a diagram of the structure of the drive mechanism for a lock of the present invention.
Figure 2:
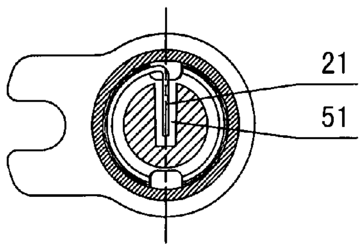
FIG. 2 is a sectional view of the drive mechanism for a lock of FIG. 1 along line A-A.
Figure 3:
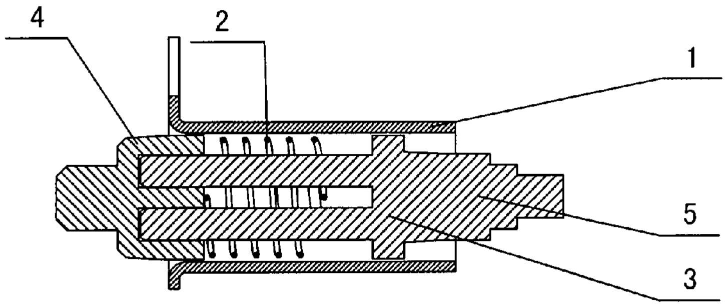
FIG. 3 is a sectional view of the drive mechanism for a lock of FIG. 1 along line B-B.

With reference to the drawings and operation examples, the present invention is further described in detail as follows. The present invention provides a drive mechanism for a lock comprising a linear-moving sleeve (1), a conversion spring (2) and a rotating component (3). The rotating component (3) is inserted into the linear-moving sleeve (1) that moves along the rotating component (3) in an axial direction. The conversion spring (2) is fitted onto the rotating component (3). The linear-moving sleeve (1) has symmetric protrusions (11).

The rotating component (3) can be of an integrated or a split structure. One embodiment of the present invention adopts the split structure for the rotating component (3) that comprises a clipping end (4) and a rotating bolt (5) with the rotating bolt (5) partially plugged into the clipping end (4). The clipping end (4) rotates together with the rotating bolt (5).

Curved ends (21) of the conversion spring (2) are inserted into a groove (51) of the rotating bolt (5) to enable the conversion spring (2) to rotate together with the rotating bolt (5).

Figure 4:
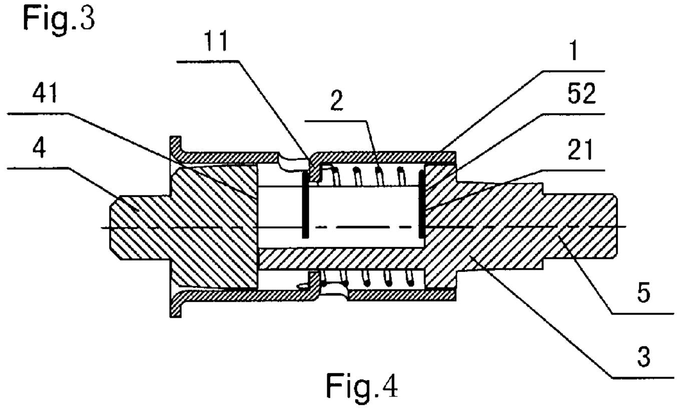
FIG. 4 is a structural diagram for the linear-moving sleeve when it moves to the left position.
Figure 5:
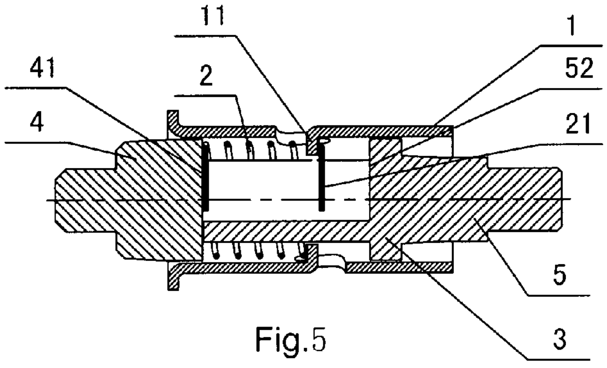
FIG. 5 is a structural diagram for the linear-moving sleeve when it moves to the right position.

As shown in FIG. 5, when the rotating bolt (5) rotates the conversion spring (2) clockwise, the symmetric protrusions (11) of the linear-moving sleeve (1) rotate in the same direction into the spiral coil/helix of the conversion spring (2). The continuous rotation of the rotating bolt (5) causes the symmetric protrusions (11) to move along the spiral coil/helix of the conversion spring (2) in a spiral thread fashion so that the conversion spring (2) is moved to the right, driving the protrusions (11) to the left simultaneously. The conversion spring (2) moves until it reaches and is constrained by an edge (52) of the rotating bolt (5). The left end of the conversion spring (2) slides on the protrusions (11) of the linear-moving sleeve (1). Under the pressure of the conversion spring (2), the linear-moving sleeve (1) retains its left-end position, as shown in FIG. 4.

As shown in FIG. 4, when the rotating bolt (5) rotates the conversion spring (2) counter-clockwise, the symmetric protrusions (11) of the linear-moving sleeve (1) rotate in the same direction into the spiral coil/helix of the conversion spring (2). The continuous rotation of the rotating bolt (5) causes the symmetric protrusions (11) to move along the spiral coil/helix of the conversion spring (2) in a spiral thread fashion so that the conversion spring (2) is moved to the left, driving the protrusions (11) to the right simultaneously. The conversion spring (2) moves until it reaches and is constrained by an edge (41) of the clipping end (4). The right end of the conversion spring (2) slides on the protrusions (11) of the linear-moving sleeve (1). Under the pressure of the conversion spring (2), the linear-moving sleeve (1) retains its right-end position, as shown in FIG. 5.

The invention claimed is:

1. A drive mechanism for a lock comprising a linear-moving sleeve, a conversion spring and a rotating component, wherein the rotating component is inserted in the linear-moving sleeve that moves along the rotating component in an axial direction; the conversion spring is fitted onto the rotating component; and the linear-moving sleeve has symmetric protrusions to cooperate with the conversion spring so that the rotation of the rotating component causes the conversion spring and the linear-moving sleeve to linearly move in opposite directions, and wherein two curved ends of the conversion spring are inserted into a groove of the rotating bolt.

2. The drive mechanism according claim 1, wherein the rotating component can be an integrated or a split structure.

3. The drive mechanism according to claim 2, wherein the rotating component is in a split structure that comprises an end and a rotating bolt with the rotating bolt partially plugged into the end.

4. The drive mechanism according to claim 3, wherein the groove is an elongated straight sectionally U-shaped groove parallel with the axial direction of the rotary bolt.

5. The drive mechanism according to claim 4, wherein the symmetric protrusions are symmetric with respect to an axis of the sleeve along its moving direction.

* * * * *